US006765180B2

(12) United States Patent
Mathews, Jr. et al.

(10) Patent No.: US 6,765,180 B2
(45) Date of Patent: Jul. 20, 2004

(54) CYCLE SKIPPING POWER CONTROL METHOD AND APPARATUS

(75) Inventors: Harry Kirk Mathews, Jr., Clifton Park, NY (US); John Stanley Glaser, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 39 days.

(21) Appl. No.: 10/248,161

(22) Filed: Dec. 22, 2002

(65) Prior Publication Data

US 2004/0118830 A1 Jun. 24, 2004

(51) Int. Cl.[7] .............................. H05B 1/02; H02J 3/12
(52) U.S. Cl. ........................ 219/492; 323/235; 219/497
(58) Field of Search ................................ 219/492, 501, 219/497; 323/235, 236, 319

(56) References Cited

U.S. PATENT DOCUMENTS

| | | | | | |
|---|---|---|---|---|---|
| 4,772,995 | A | * | 9/1988 | Gautherin et al. | 363/21.1 |
| 4,809,128 | A | * | 2/1989 | Geary | 361/264 |
| 5,585,713 | A | * | 12/1996 | Crane et al. | 323/323 |
| 6,188,208 | B1 | | 2/2001 | Glaser et al. | 323/235 |
| 6,246,034 | B1 | | 6/2001 | Glaser et al. | 219/501 |
| 2003/0085221 | A1 | * | 5/2003 | Smolenski et al. | 219/501 |

* cited by examiner

*Primary Examiner*—John A. Jeffery
(74) *Attorney, Agent, or Firm*—Jean K. Testa; Patrick K. Patnode

(57) ABSTRACT

A cycle skipping power control apparatus comprising: a power controller adapted for receiving a power command and a switch closure feedback signal and for generating a high resolution pulse command; and a pulse generator adapted for receiving the high resolution pulse command and, optionally, the power command, and generating a compensated enable pulse and the switch closure feedback signal.

57 Claims, 8 Drawing Sheets

CYCLE SKIPPING POWER CONTROL METHOD AND APPARATUS

BACKGROUND OF INVENTION

The present invention relates generally to the field of electrical power control and more specifically to the field of cycle skipping power control for alternating current (AC) electrical loads.

In a wide variety of applications, power switching devices are used to control the flow of power from an AC line voltage source to an electrical load. Examples of such power switching devices include, but are not limited to, triacs, silicon controlled rectifiers (SCRs), and relays.

Power control strategies for these applications are divided into two categories: phase control, where complete or partial AC line voltage half-cycles are passed to the load; and cycle skipping control, where only complete AC line voltage half-cycles are passed. For many applications, considerations of cost, electromagnetic interference (EMI) generation, low frequency content of the current, and power factor are the basis for selecting which category and which strategy within the selected category is best. In other applications, such as, for example, cooking appliances, additional considerations of cooking element appearance and induced ambient lighting flicker may also be important.

The performance of a particular cycle skipping control strategy depends on the temporal patterns of half-cycles used to realize the various required levels of load current. One design approach pre-stores these temporal patterns. The pre-stored pattern approach is described in Glaser, et al., U.S. Pat. No. 6,246,034 (issued Jun. 12, 2001) and Glaser, et al., U.S. Pat. No. 6,188,208 (issued Feb. 13, 2001).

An alternative design approach generates these temporal patterns in real time. In some cases, a real-time pattern generating system may be implemented in lower cost hardware than a comparable pre-stored pattern system. Opportunities exist, therefore, to reduce the cost of cycle skipping power control systems through the use of real-time pattern generation.

SUMMARY OF INVENTION

The opportunities described above are addressed, in one embodiment of the present invention, by a cycle skipping power control apparatus comprising: a power controller adapted for receiving a power command and a switch closure feedback signal and for generating a high resolution pulse command; and a pulse generator adapted for receiving the high resolution pulse command and, optionally, the power command, and generating a compensated enable pulse and the switch closure feedback signal.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
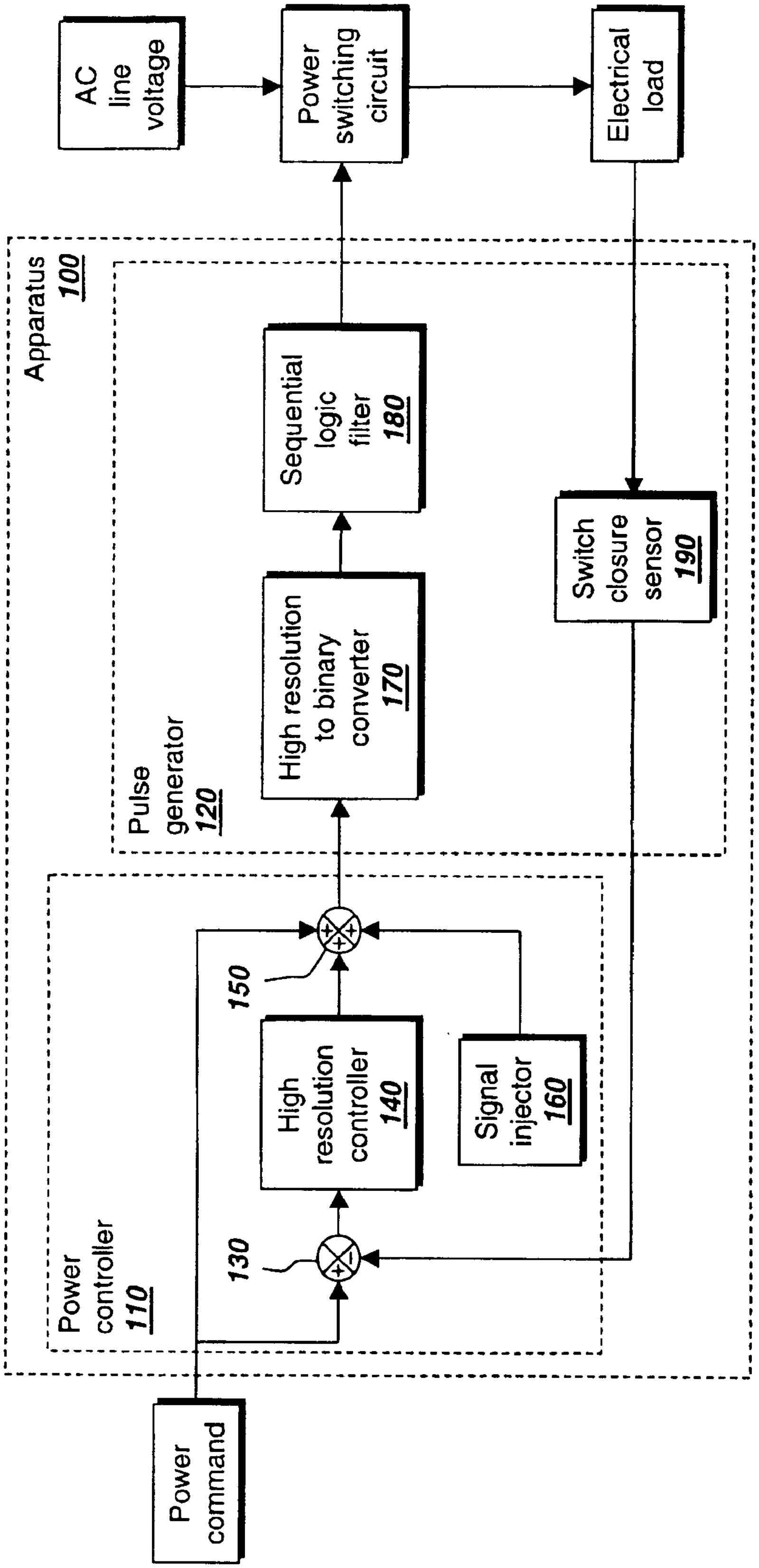
FIG. 1 illustrates a block diagram of in accordance with one embodiment of the present invention.

In accordance with one embodiment of the present invention, FIG. 1 illustrates a block diagram of a cycle skipping power control apparatus 100 comprising a power controller 110 and a pulse generator 120. In operation, power controller 110 receives a power command and a switch closure feedback signal and generates a high resolution pulse command. From the high resolution pulse command, pulse generator 120 generates a compensated enable pulse and the switch closure feedback signal. In some embodiments, pulse generator 120 also receives the power command. A power switching circuit conducts, as a function of the width of the compensated enable pulse, an integer number of half-cycles of electrical current from an alternating current line voltage source to an electrical load.

In a more detailed embodiment in accordance with the embodiment of FIG. 1, pulse generator 120 comprises a high resolution to binary converter 170, a pulse stretcher 310, and a pulse selector 320. In operation, high resolution to binary converter 170 receives the power command and generates a power element enable pulse. Pulse stretcher 310 receives the power element enable pulse and generates a stretched enable pulse. Based on the high resolution pulse command, pulse selector 320 selects between the power element enable pulse and the stretched enable pulse to generate the compensated enable pulse.

In another more detailed embodiment in accordance with the embodiment of FIG. 1, sequential logic filter 180 operates by delaying the power element enable pulse until a power line half-cycle occurs having a sign opposite to the sign of a most recently conducted power line half-cycle. Thus, any direct current (DC) produced by the previous power element enable pulse is canceled by the present power element enable pulse.

In another more detailed embodiment in accordance with the embodiment of FIG. 1, sequential logic filter 180 operates by periodically inserting a pulse to remove any DC bias.

In another more detailed embodiment in accordance with the embodiment of FIG. 1, sequential logic filter 180 operates by inserting a pulse to remove a DC bias whenever a prescribed level of DC bias has been accumulated.

Figure 2:
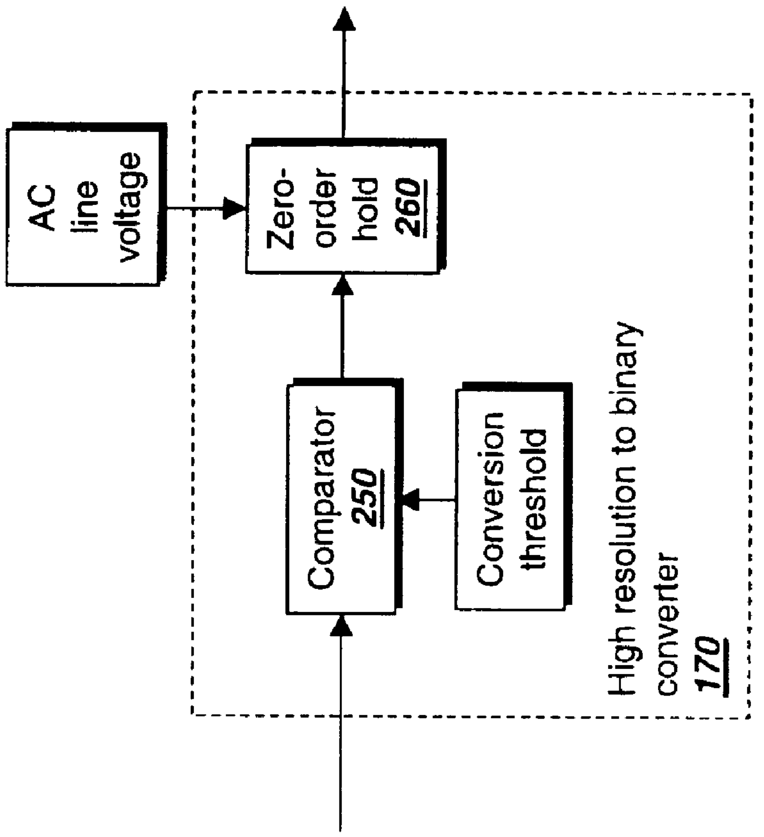
FIG. 2 illustrates a block diagram in accordance with a more specific embodiment of the embodiment of FIG. 1.

In accordance with a more specific embodiment of the embodiment of FIG. 1, FIG. 2 illustrates a block diagram wherein high resolution to binary converter 170 comprises a comparator 250 and a zero-order hold 260. In operation, comparator 250 compares the high resolution pulse command to a conversion threshold to generate a binary pulse command. Zero-order hold 260 samples the binary pulse command at zero crossings of an alternating current line voltage to generate the power element enable pulse. In some embodiments, zero-order hold 260 further operates to periodically ignore some of the zero crossings.

Figure 3:
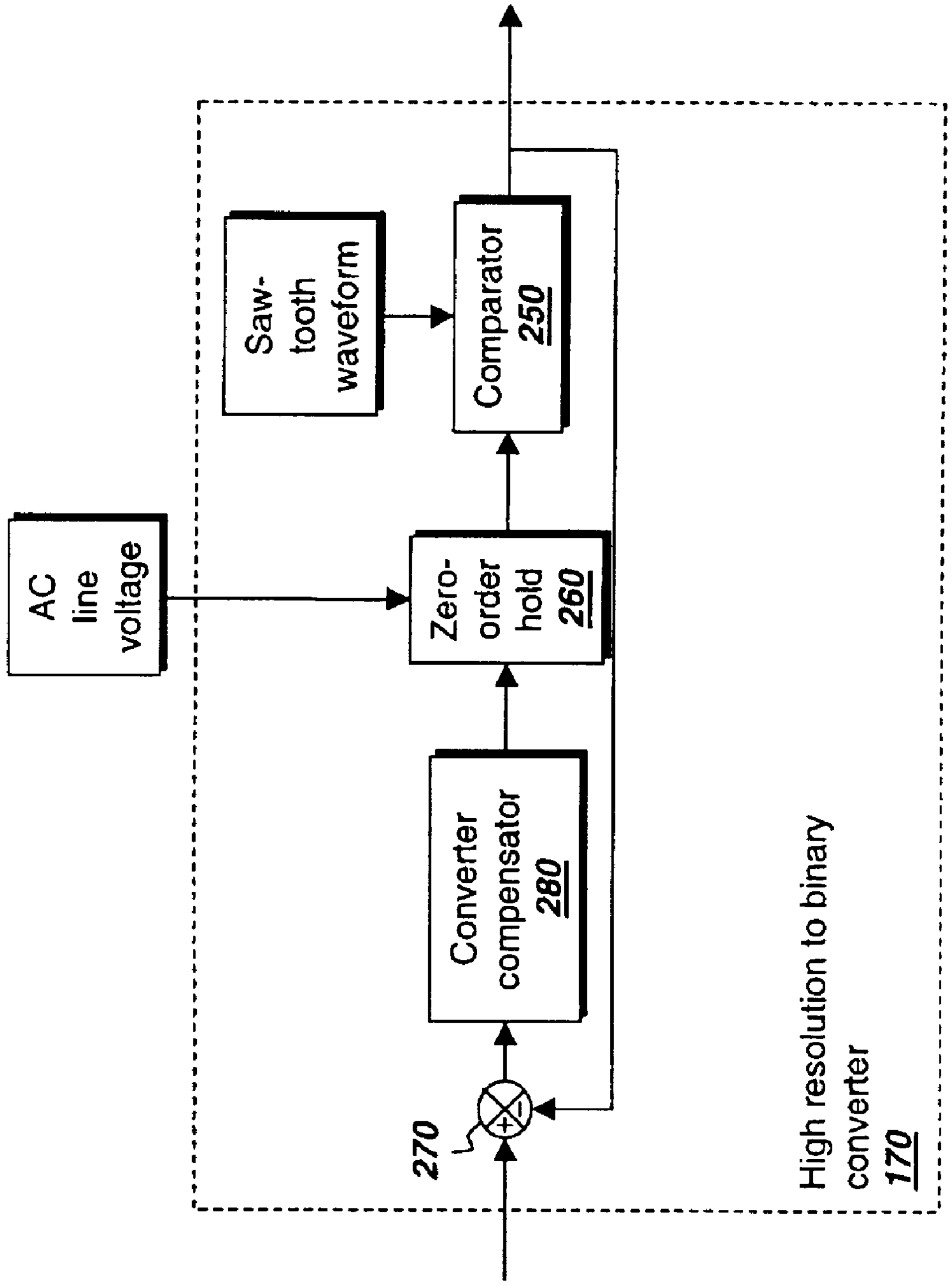
FIG. 3 illustrates a block diagram in accordance with another more specific embodiment of the embodiment of FIG. 1.

In accordance with another more specific embodiment of the embodiment of FIG. 1, FIG. 3 illustrates a block diagram wherein high resolution to binary converter 170 comprises a converter summing junction 270, a converter compensator 280, a zero-order hold 260, and a comparator 250. In operation, converter summing junction 270 subtracts a binary pulse command from the high resolution pulse command to generate a converter error signal. Converter compensator 280 receives the converter error signal and generates a compensated converter error signal. At zero crossings of an alternating current line voltage, zero-order hold 260 samples the compensated converter error signal to generate a sampled pulse width command. Comparator 250 then compares the sampled pulse width command to a sawtooth waveform to generate the power element enable pulse.

Figure 4:
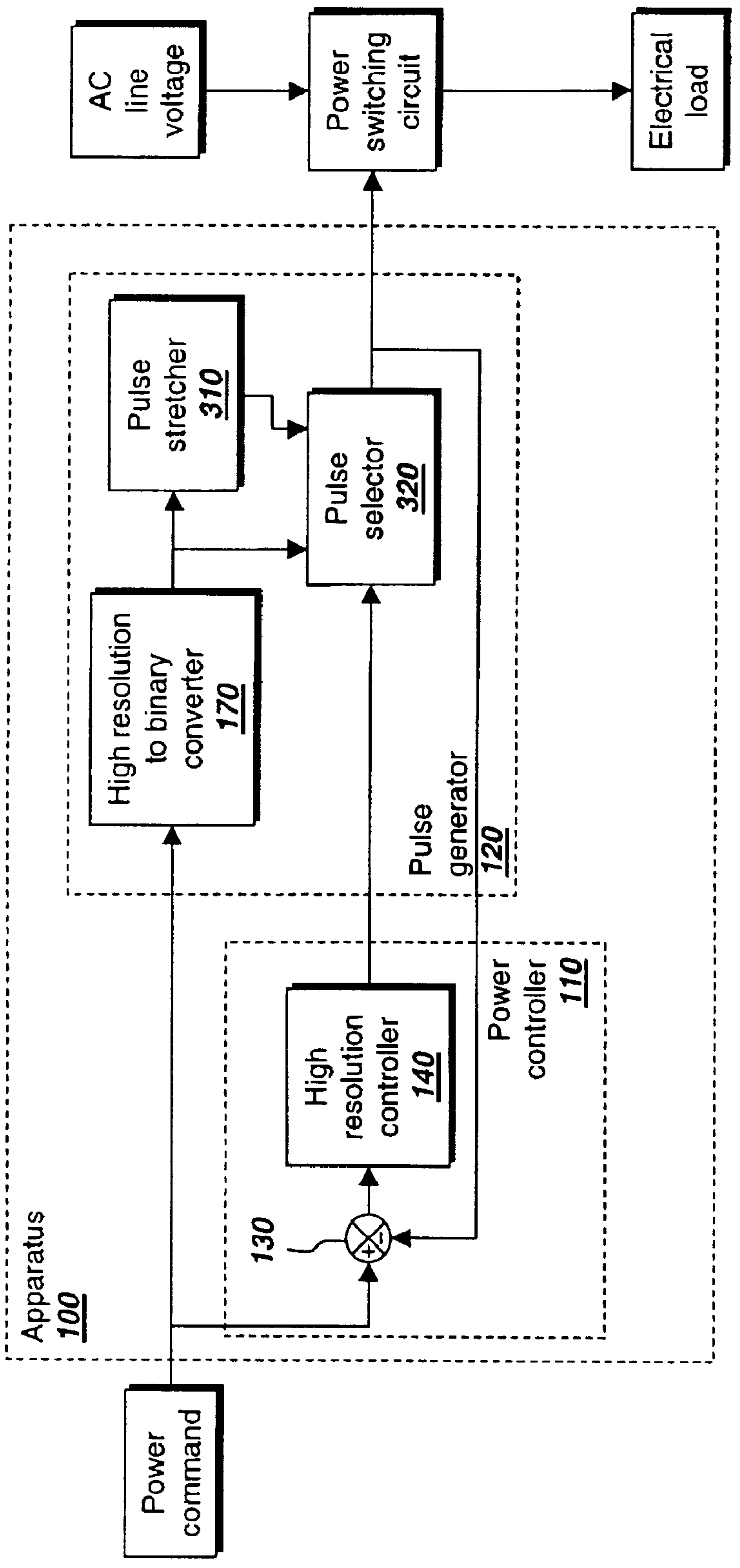
FIG. 4 illustrates a block diagram in accordance with another more specific embodiment of the embodiment of FIG. 1.

In accordance with another more detailed embodiment of the embodiment of FIG. 1, FIG. 4 illustrates a block diagram wherein pulse generator 120 comprises a high resolution to binary converter 170, a pulse stretcher 310, and a pulse selector 320. In operation, high resolution to binary converter 170 receives the power command and generates a power element enable pulse. Pulse stretcher 310 receives the power element enable pulse and generates a stretched enable pulse. Based on the high resolution pulse command, pulse selector 320 selects between the power element enable pulse and the stretched enable pulse to generate the compensated enable pulse.

Figure 5:
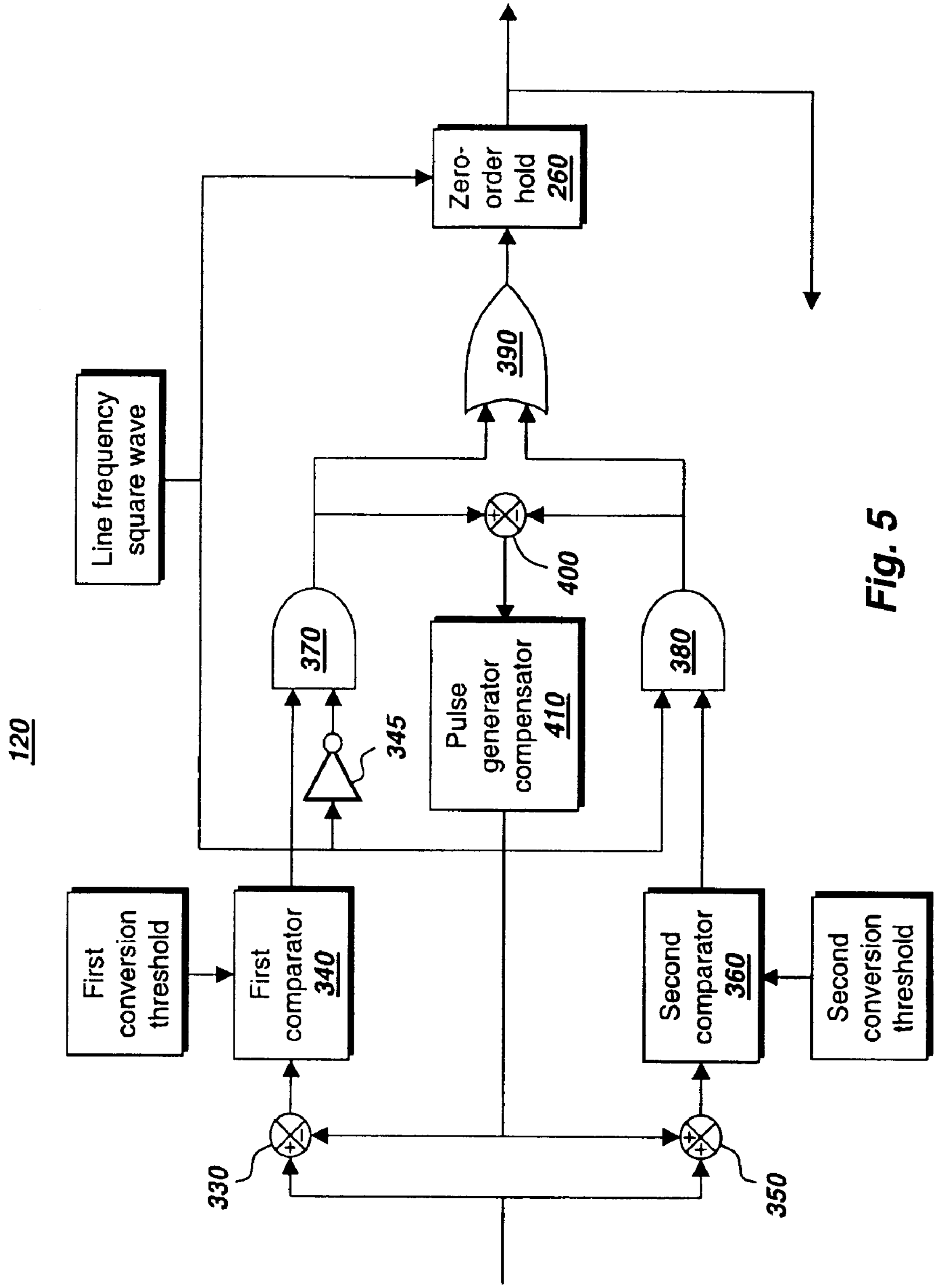
FIG. 5 illustrates a block diagram in accordance with another more specific embodiment of the embodiment of FIG. 1.

In accordance with another more specific embodiment of the embodiment of FIG. 1, FIG. 5 illustrates a block diagram wherein pulse generator 120 comprises a first pulse generator summing junction 330, a first comparator 340, an inverter 345, a first AND gate 370, a second pulse generator summing junction 350, a second comparator 360, a second AND gate 380, a third pulse generator summing junction 400, a pulse generator compensator 410, an OR gate 390, and a zero-order hold 260. In operation, first pulse generator summing junction 330 subtracts a compensated DC bias estimate from the high resolution pulse command to generate a positive current error signal which first comparator 340 compares to a first conversion threshold to generate a positive current level signal. Inverter 345 logically complements a line frequency square wave to yield an inverted line frequency square wave which first AND gate 370 conjunctively gates with the positive current level signal to yield a positive current enable pulse. Similarly, second pulse generator summing junction 350 adds the compensated DC bias estimate to the high resolution pulse command to generate a negative current error signal which second comparator 360 compares to a second conversion threshold to generate a negative current level signal. Second AND gate 380 conjunctively gates the negative current level signal with the line frequency square wave to yield a negative current enable pulse. Third pulse generator summing junction 400 subtracts the negative current enable pulse from the positive current enable pulse to generate a DC bias estimate from which pulse generator compensator 410 generates the compensated DC bias estimate. OR gate 390 disjunctively gates the positive current enable pulse with the negative current enable pulse to generate a binary pulse command which is sampled by zero-order hold 260, as triggered by the line frequency square wave, to generate the compensated enable pulse.

In another more detailed embodiment in accordance with the embodiment of FIG. 1, power controller 110 comprises a first summing junction 130 and a high resolution controller 140. In operation, first summing junction 130 subtracts the switch closure feedback signal from the power command to yield a power error signal. High resolution controller 140 receives the power error signal and generates a compensated power error signal. In some embodiments, the compensated power error signal is equal to the high resolution pulse command. In other embodiments, power controller 110 comprises a second summing junction 150 which adds the power command to the compensated power error signal to generate the high resolution pulse command.

In accordance with another more specific embodiment of the embodiment of FIG. 1, FIG. 1 illustrates a block diagram wherein power controller 110 further comprises a signal injector 160. In operation, signal injector 160 generates an excitation signal. Second summing junction 150 adds the excitation signal to the power command and the compensated power error signal to generate the high resolution pulse command.

In accordance with another more detailed embodiment of the embodiment of FIG. 1, the excitation signal is random noise. In another embodiment, the excitation signal is filtered random noise. In another embodiment, the excitation signal is periodic. In another embodiment, the excitation signal has a period equal to an odd integer multiple of half the period of the alternating current line voltage. In another embodiment, the excitation signal has a constant phase shift relative to the alternating current line voltage.

Figure 6:
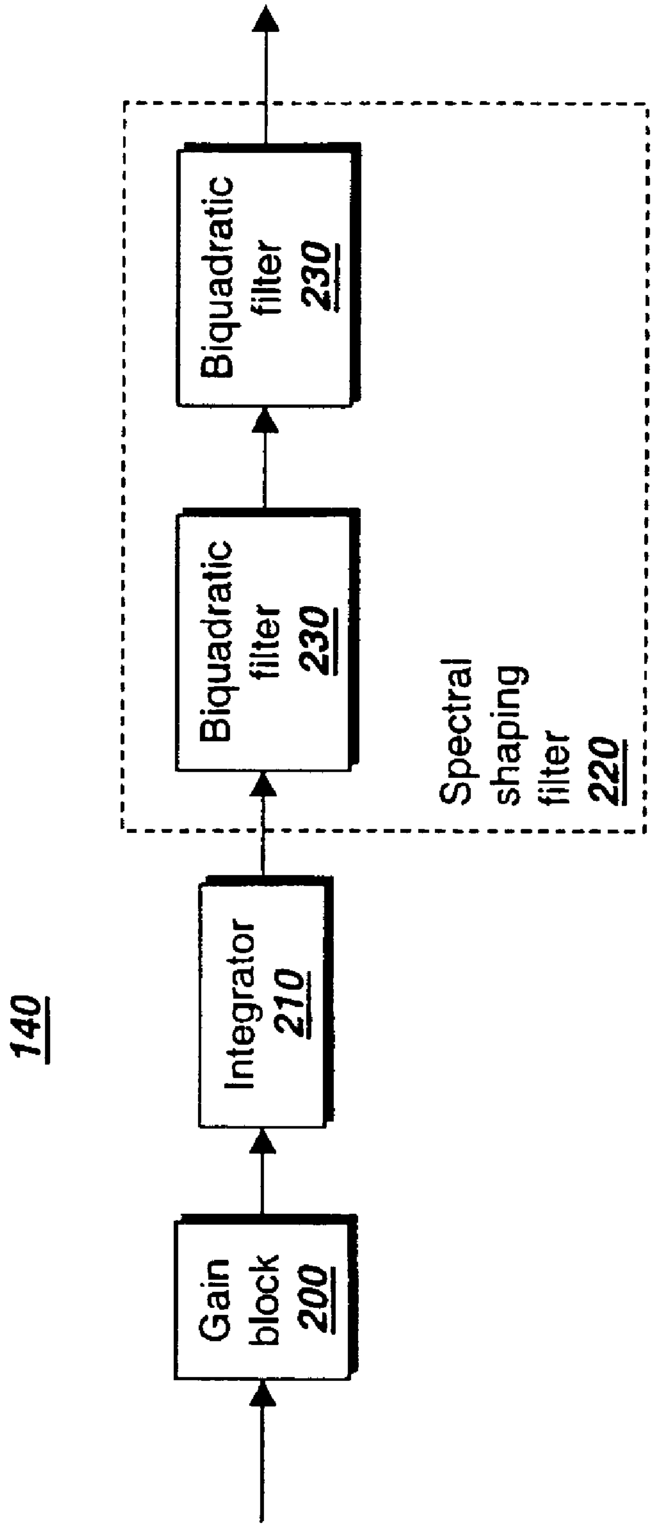
FIG. 6 illustrates a block diagram in accordance with another more specific embodiment of the embodiment of FIG. 1.

In accordance with another more detailed embodiment of the embodiment of FIG. 1, FIG. 6 illustrates a block diagram wherein high resolution controller 140 comprises a gain block 200, an integrator 210, and a spectral shaping filter 220. In operation, gain block 200 multiplies the power error signal by a gain to yield a scaled power error signal which integrator 210 integrates over time to yield an integrated power error signal. Spectral shaping filter filters the integrated power error signal to yield a shaped power error signal which is equal to the compensated power error signal. In some embodiments, spectral shaping filter (220) comprises at least one biquadratic filter (230). As used herein, "biquadratic" denotes a filter whose impulse response has a Laplace transform expressible as the ratio of two quadratic polynomials.

Figure 7:
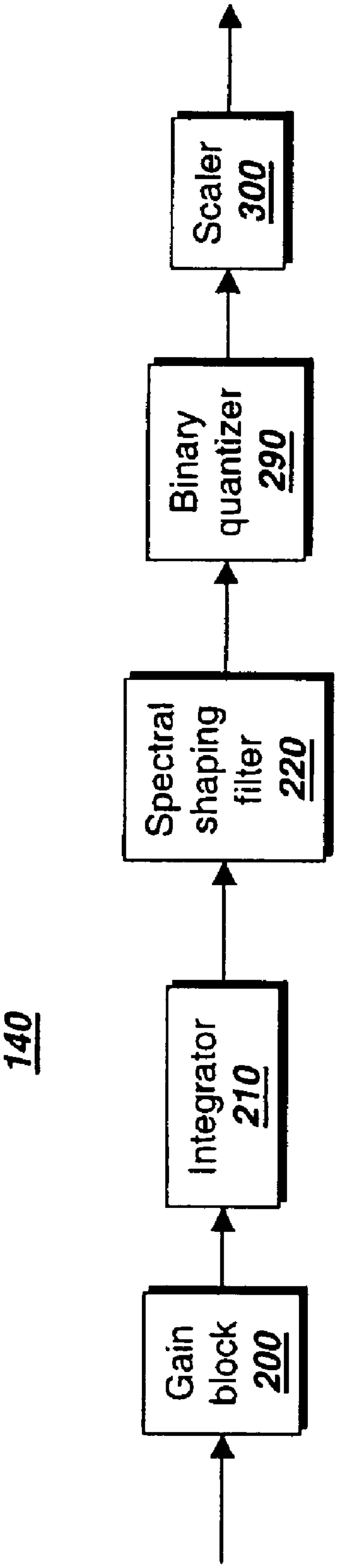
FIG. 7 illustrates a block diagram in accordance with another more specific embodiment of the embodiment of FIG. 6.

In accordance with another more specific embodiment of the embodiment of FIG. 6, FIG. 7 illustrates a block diagram wherein high resolution controller 140 further comprises a binary quantizer 290 and a scaler 300. In operation, binary quantizer 290 receives the shaped power error signal and generates a quantized power error signal which scaler 300 scales to yield the compensated power error signal.

Figure 8:
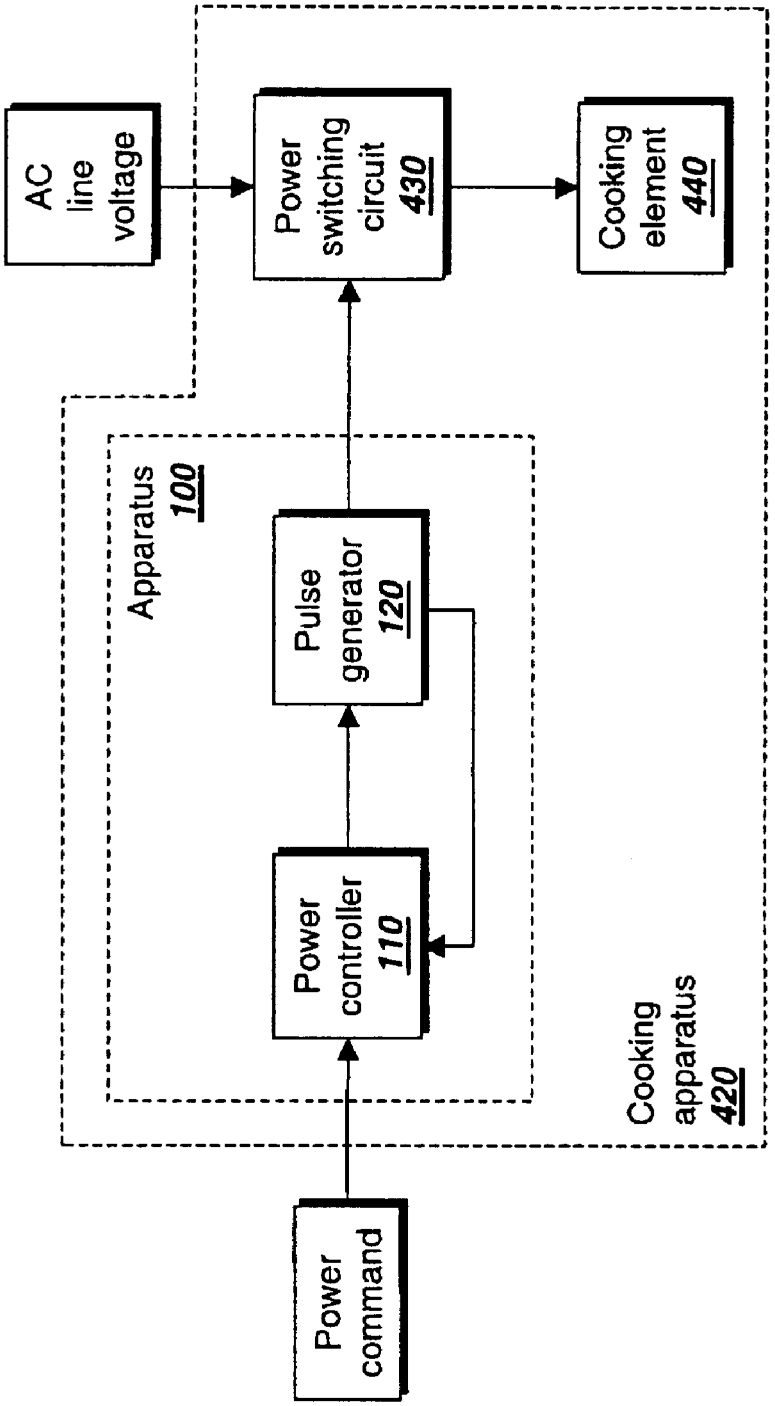
FIG. 8 illustrates a block diagram in accordance with another embodiment of the present invention.

In accordance with another embodiment of the present invention, FIG. 8 illustrates a block diagram of a cooking apparatus 420 comprising a power controller 110, a pulse generator 120, a power switching circuit 430, and a cooking element 440. In operation, power controller 110 receives a power command and a switch closure feedback signal and generates a high resolution pulse command. Pulse generator 120 receives the high resolution pulse command and, optionally, the power command, and generates a compensated enable pulse and the switch closure feedback signal. Power switching circuit 430 receives the compensated enable pulse and conducts an integer number of half-cycles of electrical current from an alternating current line voltage source to cooking element 440 which thereby generates heat. As power controller 110 and pulse generator 120 constitute cycle skipping power control apparatus 100, all of the variations leading to the foregoing embodiments of cycle skipping power control apparatus 100 apply equally to cooking apparatus 420.

All of the foregoing embodiments may be implemented using, for example, singly and in combination, components selected from the group including, without limitation: analog electronic components; analog computation modules; digital electronic components; small-, medium-, and large-scale integrated circuits; application specific integrated circuits (ASICs); programmable logical arrays (PLAs); programmable gate arrays (PGAs); microcontrollers; microprocessors; microcomputers; and any other general purpose computational devices or systems.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A cycle skipping power control apparatus comprising:

a power controller adapted for receiving a power command and a switch closure feedback signal and for generating a high resolution pulse command; and a pulse generator adapted for receiving the high resolution pulse command and, optionally, the power command, and generating a compensated enable pulse and the switch closure feedback signal.

2. The apparatus of claim 1 wherein the pulse generator further comprises:

a high resolution to binary converter adapted for receiving the high resolution pulse command and generating a power element enable pulse;

a sequential logic filter adapted for receiving the power element enable pulse and generating the compensated enable pulse, the compensated enable pulse being optionally equal to the switch closure feedback signal; and optionally, a switch closure sensor adapted for measuring an electrical load current and generating the switch closure feedback signal.

3. The apparatus of claim 2 wherein the sequential logic filter is adapted for delaying the power element enable pulse until a power line half-cycle occurs having a sign opposite to the sign of a most recently conducted power line half-cycle.

4. The apparatus of claim 2 wherein the sequential logic filter is adapted for periodically inserting a pulse to remove any direct current bias.

5. The apparatus of claim 2 wherein the sequential logic filter is adapted for inserting a pulse to remove a direct current bias whenever a prescribed level of the direct current bias has been accumulated.

6. The apparatus of claim 2 wherein the high resolution to binary converter comprises:

a comparator adapted for comparing the high resolution pulse command to a conversion threshold to generate a binary pulse command; and a zero-order hold adapted for sampling the binary pulse command at zero crossings of an alternating current line voltage to generate the power element enable pulse, the zero-order hold being optionally further adapted for periodically ignoring the zero crossings of the alternating current line voltage.

7. The apparatus of claim 2 wherein the high resolution to binary converter comprises:

a converter summing junction adapted for subtracting a binary pulse command from the high resolution pulse command to generate a converter error signal;

a converter compensator adapted for receiving the converter error signal and generating a compensated converter error signal;

a zero-order hold adapted for sampling the compensated converter error signal at zero crossings of an alternating current line voltage to generate a sampled pulse width command; and a comparator adapted for comparing the sampled pulse width command to a sawtooth waveform to generate the power element enable pulse.

8. The apparatus of claim 1 wherein the pulse generator comprises:

a high resolution to binary converter adapted for receiving the power command and generating a power element enable pulse;

a pulse stretcher adapted for receiving the power element enable pulse and generating a stretched enable pulse; and a pulse selector adapted for selecting between the power element enable pulse and the stretched enable pulse, based on the high resolution pulse command, to generate the compensated enable pulse.

9. The apparatus of claim 1 wherein the pulse generator comprises:

a first pulse generator summing junction adapted for subtracting a compensated DC bias estimate from the high resolution pulse command to generate a positive current error signal;

a first comparator adapted for comparing the positive current error signal to a first conversion threshold to generate a positive current level signal;

an inverter adapted for logically complementing a line frequency square wave to yield an inverted line frequency square wave;

a first AND gate adapted for conjunctively gating the positive current level signal with the inverted line frequency square wave to yield a positive current enable pulse;

a second pulse generator summing junction adapted for adding the compensated DC bias estimate to the high resolution pulse command to generate a negative current error signal;

a second comparator adapted for comparing the negative current error signal to a second conversion threshold to generate a negative current level signal;

a second AND gate adapted for conjunctively gating the negative current level signal with the line frequency square wave to yield a negative current enable pulse;

a third pulse generator summing junction adapted for subtracting the negative current enable pulse from the positive current enable pulse to generate a DC bias estimate;

a pulse generator compensator adapted for receiving the DC bias estimate and generating the compensated DC bias estimate;

an OR gate adapted for disjunctively gating the positive current enable pulse with the negative current enable pulse to generate a binary pulse command; and a zero-order hold adapted for sampling the binary pulse command triggered by the line frequency square wave to generate the compensated enable pulse.

10. The apparatus of claim 1 wherein the power controller comprises:

a first summing junction adapted for subtracting the switch closure feedback signal from the power command to yield a power error signal; and a high resolution controller adapted for receiving the power error signal and generating a compensated power error signal, the compensated power error signal optionally being equal to the high resolution pulse command; and optionally, a second summing junction adapted for adding the power command to the compensated power error signal to generate the high resolution pulse command.

11. The apparatus of claim 10 wherein:

the power controller further comprises a signal injector adapted for generating an excitation signal; and the second summing junction is adapted for adding the excitation signal to the power command and the compensated power error signal to generate the high resolution pulse command.

12. The apparatus of claim 11 wherein the excitation signal is random noise.

13. The apparatus of claim 11 wherein the excitation signal is filtered random noise.

14. The apparatus of claim 11 wherein the excitation signal is periodic.

15. The apparatus of claim 14 wherein the excitation signal has a period equal to an odd integer multiple of half the period of an alternating current line voltage.

16. The apparatus of claim 14 wherein the excitation signal has a constant phase shift relative to an alternating current line voltage.

17. The apparatus of claim 10 wherein the high resolution controller comprises:

a gain block adapted for multiplying the power error signal by a gain to yield a scaled power error signal;

an integrator adapted for integrating over time the scaled power error signal to yield an integrated power error signal; and a spectral shaping filter adapted for filtering the integrated power error signal to yield a shaped power error signal, the shaped power error signal being equal to the compensated power error signal.

18. The apparatus of claim 17 wherein the spectral shaping filter comprises at least one biquadratic filter adapted for filtering the integrated power error signal to generate the compensated power error signal.

19. The apparatus of claim 17 wherein the high resolution controller further comprises:

a binary quantizer adapted for receiving the shaped power error signal and generating a quantized power error signal; and a scaler adapted for scaling the quantized power error signal to yield the compensated power error signal.

20. A cooking apparatus comprising;

a power controller adapted for receiving a power command and a switch closure feedback signal and for generating a high resolution pulse command;

a pulse generator adapted for receiving the high resolution pulse command and, optionally, the power command, and generating a compensated enable pulse and the switch closure feedback signal;

a power switching circuit adapted for receiving the compensated enable pulse and conducting an integer number of half-cycles of electrical current from an alternating current line voltage source; and a cooking element adapted for receiving the integer number of half-cycles of electrical current and generating heat.

21. The cooking apparatus of claim 20 wherein the pulse generator further comprises:

a high resolution to binary converter adapted for receiving the high resolution pulse command and generating a power element enable pulse;

a sequential logic filter adapted for receiving the power element enable pulse and generating the compensated enable pulse, the compensated enable pulse being optionally equal to the switch closure feedback signal; and optionally, a switch closure sensor adapted for measuring an electrical load current and generating the switch closure feedback signal.

22. The cooking apparatus of claim 21 wherein the sequential logic filter is adapted for delaying the power element enable pulse until a power line half-cycle occurs having a sign opposite to the sign of a most recently conducted power line half-cycle.

23. The cooking apparatus of claim 21 wherein the sequential logic filter is adapted for periodically inserting a pulse to remove any direct current bias.

24. The cooking apparatus of claim 21 wherein the sequential logic filter is adapted for inserting a pulse to remove a direct current bias whenever a prescribed level of the direct current bias has been accumulated.

25. The cooking apparatus of claim 21 wherein the high resolution to binary converter comprises:

a comparator adapted for comparing the high resolution pulse command to a conversion threshold to generate a binary pulse command; and a zero-order hold adapted for sampling the binary pulse command at zero crossings of an alternating current line voltage to generate the power element enable pulse, the zero-order hold being optionally further adapted for periodically ignoring the zero crossings of the alternating current line voltage.

26. The cooking apparatus of claim 21 wherein the high resolution to binary converter comprises:

a converter summing junction adapted for subtracting a binary pulse command from the high resolution pulse command to generate a converter error signal;

a converter compensator adapted for receiving the converter error signal and generating a compensated converter error signal;

a zero-order hold adapted for sampling the compensated converter error signal at zero crossings of an alternating current line voltage to generate a sampled pulse width command; and a comparator adapted for comparing the sampled pulse width command to a sawtooth waveform to generate the power element enable pulse.

27. The cooking apparatus of claim 20 wherein the pulse generator comprises:

a high resolution to binary converter adapted for receiving the power command and generating a power element enable pulse;

a pulse stretcher adapted for receiving the power element enable pulse and generating a stretched enable pulse; and a pulse selector adapted for selecting between the power element enable pulse and the stretched enable pulse, based on the high resolution pulse command, to generate the compensated enable pulse.

28. The cooking apparatus of claim 20 wherein the pulse generator comprises:

a first pulse generator summing junction adapted for subtracting a compensated DC bias estimate from the high resolution pulse command to generate a positive current error signal;

a first comparator adapted for comparing the positive current error signal to a first conversion threshold to generate a positive current level signal;

an inverter adapted for logically complementing a line frequency square wave to yield an inverted line frequency square wave;

a first AND gate adapted for conjunctively gating the positive current level signal with the inverted line frequency square wave to yield a positive current enable pulse;

a second pulse generator summing junction adapted for adding the compensated DC bias estimate to the high resolution pulse command to generate a negative current error signal;

a second comparator adapted for comparing the negative current error signal to a second conversion threshold to generate a negative current level signal;

a second AND gate adapted for conjunctively gating the negative current level signal with the line frequency square wave to yield a negative current enable pulse;

a third pulse generator summing junction adapted for subtracting the negative current enable pulse from the positive current enable pulse to generate a DC bias estimate;

a pulse generator compensator adapted for receiving the DC bias estimate and generating the compensated DC bias estimate;

an OR gate adapted for disjunctively gating the positive current enable pulse with the negative current enable pulse to generate a binary pulse command; and a zero-order hold adapted for sampling the binary pulse command triggered by the line frequency square wave to generate the compensated enable pulse.

29. The cooking apparatus of claim 20 wherein the power controller comprises:

a first summing junction adapted for subtracting the switch closure feedback signal from the power command to yield a power error signal; and a high resolution controller adapted for receiving the power error signal and generating a compensated power error signal, the compensated power error signal optionally being equal to the high resolution pulse command; and optionally, a second summing junction adapted for adding the power command to the compensated power error signal to generate the high resolution pulse command.

30. The cooking apparatus of claim 29 wherein:

the power controller further comprises a signal injector adapted for generating an excitation signal; and the second summing junction is adapted for adding the excitation signal to the power command and the compensated power error signal to generate the high resolution pulse command.

31. The cooking apparatus of claim 30 wherein the excitation signal is random noise.

32. The cooking apparatus of claim 30 wherein the excitation signal is filtered random noise.

33. The cooking apparatus of claim 30 wherein the excitation signal is periodic.

34. The cooking apparatus of claim 33 wherein the excitation signal has a period equal to an odd integer multiple of half the period of an alternating current line voltage.

35. The cooking apparatus of claim 33 wherein the excitation signal has a constant phase shift relative to an alternating current line voltage.

36. The cooking apparatus of claim 29 wherein the high resolution controller comprises:

a gain block adapted for multiplying the power error signal by a gain to yield a scaled power error signal;

an integrator adapted for integrating over time the scaled power error signal to yield an integrated power error signal; and a spectral shaping filter adapted for filtering the integrated power error signal to yield a shaped power error signal, the shaped power error signal being equal to the compensated power error signal.

37. The cooking apparatus of claim 36 wherein the spectral shaping filter comprises at least one biquadratic filter adapted for filtering the integrated power error signal to generate the compensated power error signal.

38. The cooking apparatus of claim 36 wherein the high resolution controller further comprises:

a binary quantizer adapted for receiving the shaped power error signal and generating a quantized power error signal; and a scaler adapted for scaling the quantized power error signal to yield the compensated power error signal.

39. A cycle skipping power control method comprising:

generating a high resolution pulse command from a power command and a switch closure feedback signal; and generating a compensated enable pulse and the switch closure feedback signal from the high resolution pulse command and, optionally, the power command.

40. The method of claim 39 wherein the act of generating a compensated enable pulse and the switch closure feedback signal further comprises:

generating a power element enable pulse from the high resolution pulse command;

generating the compensated enable pulse from the power element enable pulse, the compensated enable pulse being optionally equal to the switch closure feedback signal; and optionally, measuring an electrical load current and generating the switch closure feedback signal.

41. The method of claim 40 wherein the act of generating the compensated enable pulse comprises delaying the power element enable pulse until a power line half-cycle occurs having a sign opposite to the sign of a most recently conducted power line half-cycle.

42. The method of claim 40 wherein the act of generating the compensated enable pulse comprises periodically inserting a pulse to remove any direct current bias.

43. The method of claim 40 wherein the act of generating the compensated enable pulse comprises inserting a pulse to remove a direct current bias whenever a prescribed level of the direct current bias has been accumulated.

44. The method of claim 40 wherein the act of generating a power element enable pulse comprises:

comparing the high resolution pulse command to a conversion threshold to generate a binary pulse command; and sampling the binary pulse command at zero crossings of an alternating current line voltage to generate the power element enable pulse, optionally, periodically ignoring the zero crossings of the alternating current line voltage.

45. The method of claim 40 wherein the act of generating a power element enable pulse comprises:

subtracting a binary pulse command from the high resolution pulse command to generate a converter error signal;

generating a compensated converter error signal from the converter error signal;

sampling the compensated converter error signal at zero crossings of an alternating current line voltage to generate a sampled pulse width command; and comparing the sampled pulse width command to a sawtooth waveform to generate the power element enable pulse.

46. The method of claim 39 wherein the act of generating a compensated enable pulse comprises:

generating a power element enable pulse from the power command;

generating a stretched enable pulse from the power element enable pulse; and selecting between the power element enable pulse and the stretched enable pulse, based on the high resolution pulse command, to generate the compensated enable pulse.

47. The method of claim 39 wherein the act of generating a compensated enable pulse comprises:

subtracting a compensated DC bias estimate from the high resolution pulse command to generate a positive current error signal;

comparing the positive current error signal to a first conversion threshold to generate a positive current level signal;

logically complementing a line frequency square wave to yield an inverted line frequency square wave;

conjunctively gating the positive current level signal with the inverted line frequency square wave to yield a positive current enable pulse;

adding the compensated DC bias estimate to the high resolution pulse command to generate a negative current error signal;

comparing the negative current error signal to a second conversion threshold to generate a negative current level signal;

conjunctively gating the negative current level signal with the line frequency square wave to yield a negative current enable pulse;

subtracting the negative current enable pulse from the positive current enable pulse to generate a DC bias estimate;

generating the compensated DC bias estimate from the DC bias estimate;

disjunctively gating the positive current enable pulse with the negative current enable pulse to generate a binary pulse command; and sampling the binary pulse command triggered by the line frequency square wave to generate the compensated enable pulse.

48. The method of claim 39 wherein the act of generating a high resolution pulse command comprises:

subtracting the switch closure feedback signal from the power command to yield a power error signal;

generating a compensated power error signal from the power error signal, the compensated power error signal optionally being equal to the high resolution pulse command; and optionally, adding the power command to the compensated power error signal to generate the high resolution pulse command.

49. The method of claim 48 wherein:

the act of generating a high resolution pulse command further comprises generating an excitation signal; and adding the excitation signal to the power command and the compensated power error signal to generate the high resolution pulse command.

50. The method of claim 49 wherein the excitation signal is random noise.

51. The method of claim 49 wherein the excitation signal is filtered random noise.

52. The method of claim 49 wherein the excitation signal is periodic.

53. The method of claim 52 wherein the excitation signal has a period equal to an odd integer multiple of half the period of an alternating current line voltage.

54. The method of claim 52 wherein the excitation signal has a constant phase shift relative to an alternating current line voltage.

55. The method of claim 48 wherein the act of generating a compensated power error signal comprises:

multiplying the power error signal by a gain to yield a scaled power error signal; integrating over time the scaled power error signal to yield an integrated power error signal; and filtering the integrated power error signal to yield a shaped power error signal, the shaped power error signal being equal to the compensated power error signal.

56. The method of claim 55 wherein the act of filtering the integrated power error signal comprises filtering the integrated power error signal through at least one biquadratic filter to generate the compensated power error signal.

57. The method of claim 55 wherein the act of generating a compensated power error signal further comprises:

generating a quantized power error signal from the shaped power error signal; and scaling the quantized power error signal to yield the compensated power error signal.

* * * * *